United States Patent [19]

Niedospial, Jr.

[11] Patent Number: 4,887,113

[45] Date of Patent: Dec. 12, 1989

[54] FILM CASSETTE AND METHOD OF ASSEMBLING THE SAME

[75] Inventor: John J. Niedospial, Jr., Rochester, N.Y.

[73] Assignee: Eastman Kodak Company, Rochester, N.Y.

[21] Appl. No.: 296,550

[22] Filed: Jan. 12, 1989

[51] Int. Cl.$^4$ ............................................. G03B 17/26
[52] U.S. Cl. ..................................... 354/275; 242/71.1
[58] Field of Search .................. 354/275, 216; 242/71, 242/71.1, 71.2

[56] References Cited

U.S. PATENT DOCUMENTS

| | | | |
|---|---|---|---|
| 2,072,625 | 3/1937 | Rose | 242/71.1 |
| 2,153,573 | 4/1939 | Kinloch | 242/71.1 |
| 2,172,255 | 9/1939 | Nagel | 242/71.1 |
| 3,282,527 | 11/1966 | D'Incerti | 242/71.1 |
| 4,407,579 | 10/1983 | Huff | 354/275 |

FOREIGN PATENT DOCUMENTS 657954  3/1938  Fed. Rep. of Germany ..... 242/71.1

Primary Examiner—L. T. Hix
Assistant Examiner—Brian W. Brown
Attorney, Agent, or Firm—Roger A. Fields

[57] ABSTRACT

A film cassette is constructed from several cassette components which, when assembled, collectively comprise a film spool, a tubular-like casing substantially surrounding the film spool and having a pair of spaced lips which define a film passage slit from the spool, and a pair of end caps covering respective open ends of the casing. The end caps are connected by an integral bridge or spout portion which completely encloses the two lips and includes a film passage opening to the film passage slit. This arrangement provides a relative secure assembled cassette.

4 Claims, 3 Drawing Sheets

FILM CASSETTE AND METHOD OF ASSEMBLING THE SAME

BACKGROUND OF THE INVENTION

1. Field of the Invention

The invention relates generally to the field of photography, and more particularly to a film cassette for photographic film and to a method of assembling the cassette.

2. Description of the Prior Art

Prior art in U.S. Pat. No. 2,153,573 issued Apr. 11, 1939 discloses a light-tight cassette, most likely for 35 mm film, comprising (a) a film spool having coaxially spaced end flanges between which a roll of film is coiled about the spool core, (b) a tubular casing substantially surrounding the film spool, and (c) a pair of cup-shaped end caps covering the opposite open ends of the casing. The casing includes a pair of spaced integral lips which define a film passage slit from the spool, and the end caps include corresponding integral portions which project coextensively with the two lips to cover the opposite open ends of the casing along the lips. Each of the integral portions of the end caps includes a separator which projects slightly into the film passage slit to hold the two lips apart.

While the film cassette disclosed in U.S. Pat. No. 2,153,573 has certain advantages, such as ease of assembly, the end caps are required to be fixed to the opposite open ends of the tubular casing by adhesive tape or other suitable means. Moreover, the two lips of the tubular casing, since they are only supported at the opposite open ends of the casing, are not very secure.

SUMMARY OF THE INVENTION

According to the invention there is provided a film cassette and a method of assembling the same which are improved over the version disclosed in U.S. Pat. No. 2,153,573.

More particularly, there is provided a film cassette comprising (a) a film spool, (b) a tubular-like casing substantially surrounding said film spool and having a pair of spaced lips which define a film passage slit from said film spool, and (c) a pair of end caps covering respective opposite open ends of said tubular-like casing, characterized in that:

said end caps are connected by an intermediate bridge or snout portion which encloses said lips and includes a film passage opening to said film passage slit.

Since the end caps include an intermediate bridge or snout portion which is adapted to enclose the two lips of the tubular-like casing, a more secure cassette is obtained as compared to the one disclosed in U.S. Pat. No. 2,153,573.

Also, there is provided a method of assembling a film cassette from a plurality of cassette components comprising (a) a film spool, (b) a tubular-like casing adapted to substantially surround the film spool and having a pair of spaced lips which define a film passage slit, and (c) a pair of end caps adapted to cover respective opposite open ends of the tubular-like casing and connected by an intermediate bridge portion which can be flexed to move the end caps away and towards each other and includes a film passage opening for the film passage slit, said method comprising the steps:

positioning the film spool within the tubular-like casing;

moving the end caps sufficiently away from each other, by flexing the intermediate bridge portion, to permit the tubular-like casing to be readily positioned between the end caps.

positioning the tubular-like casing between the end caps and positioning the intermediate bridge portion across the two lips of the casing to align the film passage opening of the bridge portion with the film passage slit of the casing; and moving the end caps towards each other, by flexing the bridge portion, to cause the end caps to cover the opposite open ends of the tubular-like casing.

DETAILED DESCRIPTION OF THE PREFERRED EMBODIMENT

The invention is disclosed as being embodied preferably in a 35 mm film cassette. Because the features of this type of film cassette are generally well known, the description which follows is directed in particular to elements forming part of or cooperating directly with the disclosed embodiment. It is to be understood, however, that other elements not specifically shown or described may take various forms known to persons of ordinary skill in the art.

Figure 1:
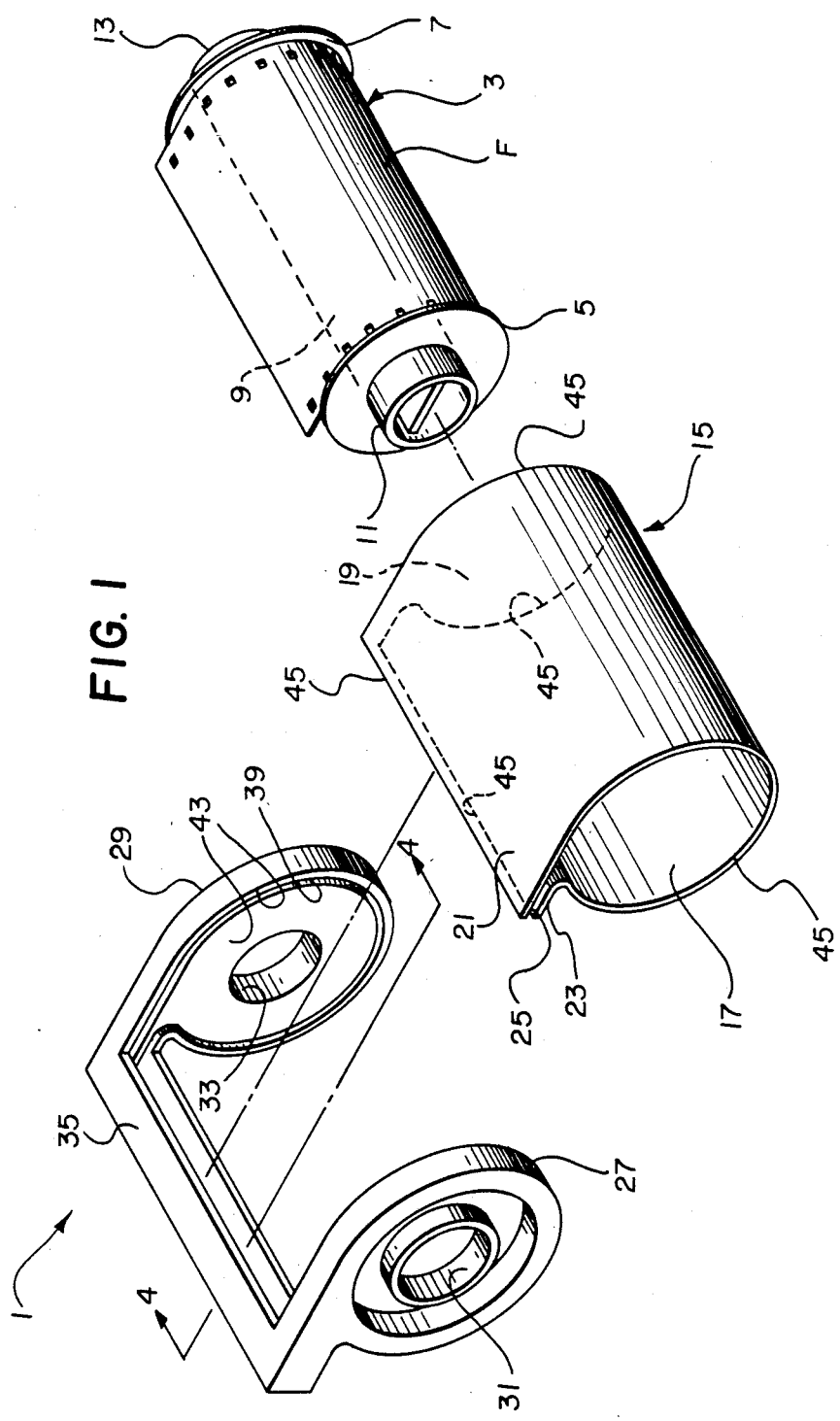
FIG. 1 is an exploded perspective view of the various components of a film cassette, according to a preferred embodiment of the invention.

Referring now to the drawings, FIG. 1 depicts a film cassette 1 shown with the various cassette components unassembled with respect to each other.

A conventional film spool 3 comprises a pair of coaxially spaced flanges 5 and 7 between which a 35 mm filmstrip F is coiled about a longitudinal spool core 9. The spool core 9 is fixed to the two flanges 5 and 7 and includes opposite core ends or shanks 11 and 13.

Figure 3:
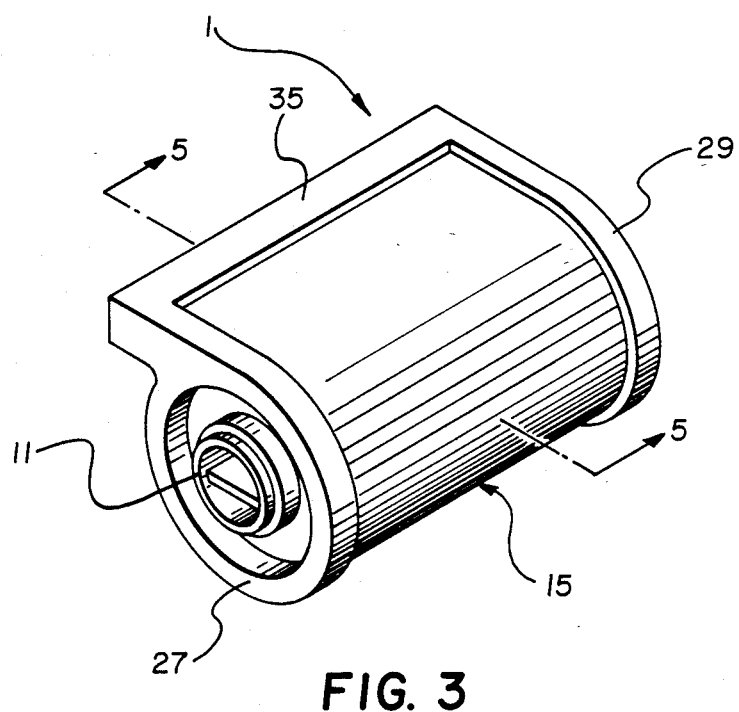
FIG. 3 is a perspective view of the film cassette, showing it completely assembled.

A cylindrical tubular casing 15, formed from plastic or metal sheet material and open at its opposite ends 17 and 19 is adapted to substantially surround the film spool 3. See FIGS. 1, 3, and 5. The casing 15 includes a pair of integrally formed lips 21 and 23 which are slightly spaced apart to define a film passage slit 25 from the film spool 3. Although not shown, known light-excluding material, such as black velvet or black plush, is located on each of the lips 21 and 23 along the film passage slit 25. Alternatively, of course, the lips 21 and 23 could include a light-trapping labyrinth.

Figure 2:
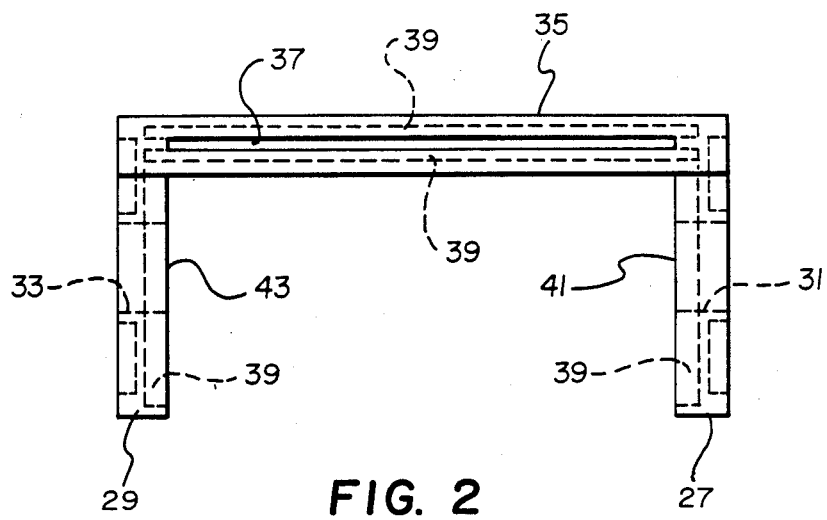
FIG. 2 is a front elevation view of the film cassette.
Figure 4:
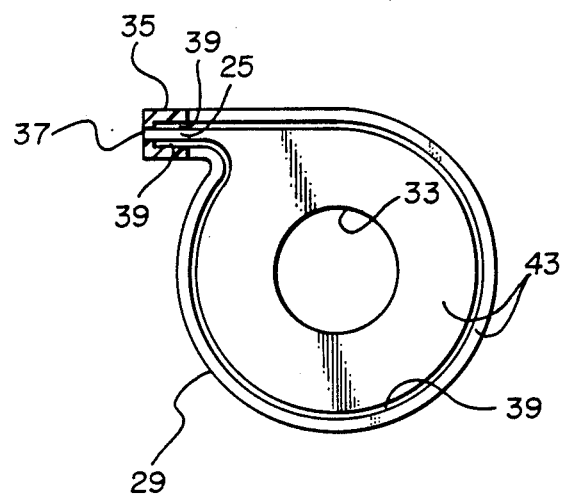
FIG. 4 is a sectional elevation view of the film cassette as seen in the direction of the arrows 4,4 in FIG. 1.
Figure 5:
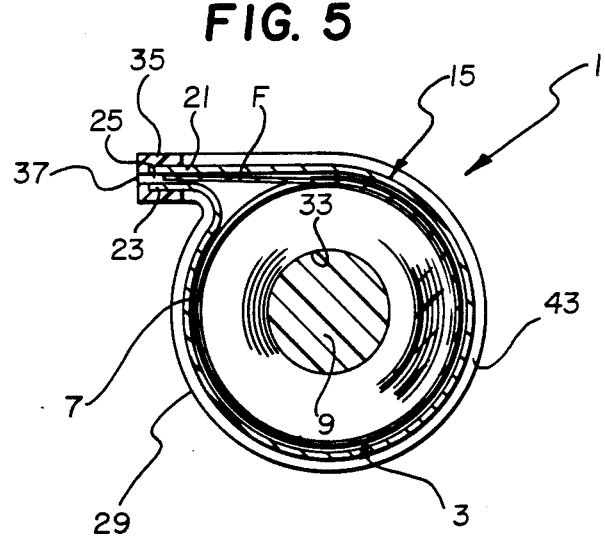
FIG. 5 is a sectional elevational view of the film cassette as seen in the direction of the arrows 5,5 in FIG. 3.

A pair of cup-shaped end caps 27 and 29 are adapted to cover the opposite open ends 17 and 19 of the casing 15 and include respective bearing-seal openings 31 and 33 for receiving the two core ends 11 and 13 of the film spool 3. The end caps 27 and 29 are connected by an integrally formed, intermediate bridge portion or snout 35 which is adapted to completely enclose the two lips 21 and 23 of the casing 15. See FIGS. 3 and 5. A film passage opening 37, shown in FIGS. 2, 4 and 5, is located in the bridge portion 35 for alignment with the film passage slit 25 defined by the two lips 21 and 23. A continuous channel or groove 39 is cut in an inside planar face 41 of the end cap 27, and inside planar face 43 of the end cap 29, and corresponding inside mutually perpendicular faces (no reference nos.) of the bridge portion 35. The continuous groove 39 is intended to receive a continuous edge 45 of the casing 15 which runs along the opposite open ends 17 and 19 of the casing and along the two lips 21 and 23. See FIG. 1. The engagement of the continuous groove 39 and the corresponding edge 45 serves to firmly maintain the shape of the casing 15 and to hold the two lips 21 and 23 apart. In addition, a separator rib (not shown) integrally formed with the end caps 27 and 29, such as disclosed in U.S. Pat. No. 2,153,573, can be provided to fix the space between the two lips 21 and 23.

To assemble the film cassette 1 from the various cassette components, first the film spool 3 is positioned within the casing 15. Then, the end caps 27 and 29 are moved slightly away from each other by flexing or bending the intermediate bridge portion 35. This permits the open ends 17 and 19 of the casing 15 to be positioned between the end caps 27 and 29, and it permits the two lips 21 and 23 of the casing to be positioned within the bridge portion 35. Then, the ends caps 27 and 29 are released to move towards each other to cover the open ends 17 and 19 of the casing 15. At this time, the continuous edge 45 of the casing 15 will be located in the matching groove 39 in the end caps 27 and 29 and the bridge portion 35, and the film passage opening 37 in the bridge portion will be aligned with the film passage slit 25 defined by the two lips 21 and 23. See FIG. 5.

The invention has been described with reference to a preferred embodiment. However, it will be appreciated that variations and modifications can be effected within the ordinary skill in the art without departing from the scope of the invention.

I claim:

1. A film cassette comprising (a) a film spool, (b) a tubular-like casing substantially surrounding said film spool and having a pair of spaced lips which define a film passage slit from said film spool, and (c) a pair of end caps covering respective opposite ends of said tubular-like casing, characterized in that:

said end caps are connected by an intermediate bridge portion which encloses said lips and includes a film passage opening to said film passage slit.

2. A film cassette as recited in claim 1, wherein said bridge portion is integrally formed with said end caps.

3. A method of assembling a film cassette from a plurality of cassette components comprising (a) a film spool, (b) a tubular-like casing adapted to substantially surround the film spool and having a pair of spaced lips which define a film passage slit, and (c) a pair of end caps adapted to cover respective opposite ends of the tubular-like casing and connected by an intermediate bridge portion which can be flexed to move the end caps away and towards each other and includes a film passage opening for the film passage slit, said method comprising the steps:

positioning the film spool within the tubular-like casing;

moving the end caps sufficiently away from each other, by flexing the intermediate bridge portion, to permit the tubular-like casing to be readily positioned between the end caps;

positioning the tubular-like casing between the end caps and positioning the intermediate bridge portion across the two lips of the casing to align the film passage opening of the bridge portion with the film passage slit of the casing; and moving the end caps towards each other, by flexing the bridge portion, to cause the end caps to cover the opposite ends of the tubular-like casing.

4. A method as recited in claim 3, wherein the bridge portion is adapted to enclose the two lips of the tubular-like casing, and wherein the step of positioning the bridge portion across the two lips to align the film passage opening of the bridge portion with the film passage slit of the casing includes positioning the bridge portion in addition to enclose the two lips.

* * * * *